(12) United States Patent
Odgaard et al.

(10) Patent No.: US 8,617,767 B2
(45) Date of Patent: Dec. 31, 2013

(54) METHODS AND SYSTEMS FOR DETERMINING AND CONTROLLING FUEL CONCENTRATIONS IN FUEL CELLS

(75) Inventors: Madeleine Odgaard, Odense M (DK);
Steen Yde-Andersen, Svendborg (DK);
Joergen Sehjerning Lundsgaard,
Svendborg (DK)

(73) Assignee: IRD Fuel Cells A/S, Svendborg (DK)

( * ) Notice: Subject to any disclaimer, the term of this patent is extended or adjusted under 35 U.S.C. 154(b) by 271 days.

(21) Appl. No.: 12/429,363

(22) Filed: Apr. 24, 2009

(65) Prior Publication Data

US 2009/0269625 A1 Oct. 29, 2009

Related U.S. Application Data

(60) Provisional application No. 61/047,458, filed on Apr. 24, 2008.

(51) Int. Cl.
*H01M 8/22* (2006.01)
*H01M 8/00* (2006.01)
*H01M 8/04* (2006.01)

(52) U.S. Cl.
USPC ........... 429/502; 429/400; 429/428; 429/431; 429/432

(58) Field of Classification Search
USPC .................. 429/400, 428–432, 502
See application file for complete search history.

(56) References Cited

U.S. PATENT DOCUMENTS

| | | | |
|---|---|---|---|
| 6,698,278 B2 | 3/2004 | Zhang et al. | 73/61.76 |
| 6,794,067 B1 | 9/2004 | Acker et al. | 429/13 |
| 6,824,899 B2 | 11/2004 | Acker et al. | 429/13 |
| 7,201,980 B2 | 4/2007 | Sudo et al. | 429/13 |
| 2002/0086193 A1 | 7/2002 | Acker et al. | 429/22 |
| 2006/0063053 A1* | 3/2006 | Higashionji et al. | 429/30 |
| 2006/0204814 A1 | 9/2006 | Sekino et al. | 429/34 |

FOREIGN PATENT DOCUMENTS

| | | |
|---|---|---|
| EP | 1 646 101 | 4/2006 |
| EP | 1 858 096 | 11/2007 |
| EP | 1858096 A1 * | 11/2007 |
| WO | 2006/056076 | 6/2006 |
| WO | PCT/EP2009/055008 | 11/2010 |

* cited by examiner

*Primary Examiner* — Karie O'Neill Apicella
(74) *Attorney, Agent, or Firm* — Licata & Tyrrell, P.C.

(57) ABSTRACT

Methods and systems for electrical determination and adjustment of the fuel concentration in direct methanol fuel cells (DMFC) are provided.

1 Claim, 5 Drawing Sheets

METHODS AND SYSTEMS FOR DETERMINING AND CONTROLLING FUEL CONCENTRATIONS IN FUEL CELLS

This patent application claims the benefit of priority from U.S. Provisional Application Ser. No. 61/047,458, filed Apr. 24, 2008, teachings of which are herein incorporated by reference in their entirety.

FIELD OF THE INVENTION

The present invention relates to methods and systems for electrical determination and adjustment of the fuel concentration in a direct alcoholic fuel cell such as a direct methanol fuel cell (DMFC).

BACKGROUND OF THE INVENTION

Direct alcoholic fuel cells convert an alcohol fuel to hydrogen ions and carbon dioxide internally through a reaction analogous to the following for a direct methanol fuel cell:

$$\text{Anode: } CH_3OH + H_2O \Rightarrow CO_2 + 6H^+ + 6e^- \tag{1}$$

Hydrogen ions are conducted from the anode through the polymer electrolyte. Electrons are conducted to the cathode through the external electric circuit where oxygen is reduced to water according to the reaction:

$$\text{Cathode: } 3/2 O_2 + 6H^+ + 6e^- \Rightarrow 3H_2O \tag{2}$$

The complete electrochemical reaction is:

$$CH_3OH + 3/2 O_2 + H_2O \Rightarrow CO_2 + 3H_2O \tag{3}$$

As shown by this reaction, the fuel cell relies on the presence of liquid water to efficiently conduct the protons. The theoretical voltage of the fuel cell based upon this chemistry is 1.18 V.

The hydrogen ion conducting membrane separating the anode and the cathode of the fuel cell is an acidic proton conducting polymer selected from commercially available solid polymer electrolytes such as NAFION (a sulfonated tetrafluorethylene copolymer; DuPont Fuel Cells, Fayetteville, N.C., USA), Flemion (a perfluorinated carboxylic acid membrane), and ACIPLEX-S (perfluorosulfonated ionomer membrane, Asahi Chemical Company, Kawasaki, Japan).

Maintenance of fuel cell efficiency depends on the ability to retain the methanol solution in the methanol fuel compartment on the anode side of the membrane, adequate fuel replenishment and on a low internal resistance in the cell.

Methanol diffusion through the electrolyte membrane causes a phenomena known as "chemical short circuiting" of the fuel cell. Methanol which reaches the cathode reacts wastefully with oxygen in a similar fashion to reaction (3). However, in this wasteful reaction electrons do not traverse the external electrical circuit and cannot provide useful electrical energy. This situation is aggravated when methanol concentrations in the anode fuel compartment are raised because a high methanol concentration is a driving force for diffusion of methanol through the membrane.

On the other hand, maintenance of the electrochemical reaction rates depends on the supply of adequate methanol. Denudation of the methanol concentration leads to reduced power generation.

In a DMFC stack, the fuel is circulated through the stack and depleished fuel is returned to the fuel compartment. Since part of the methanol is used by the electrochemical reaction, the methanol concentration in the compartment is reduced. Consequently, the individual cell and whole stack impedance will change unless the methanol concentration is maintained. The methanol concentration increases when water is lost thereby resulting in impedance increase.

It is therefore desirable to control methanol concentration in fuel cells in order to optimize efficiency of the DMFC stack and maintain output.

Satisfactory control can be achieved by measuring the methanol concentration and compensating for methanol consumption. Consumption of fuel can be calculated on the basis of the electrical charge transferred. The methanol concentration can be maintained at a specified level by addition of water as diluent or addition of alcohol as a concentrate or as a pure substance.

Water and methanol can evaporate from the fuel tank, thereby affecting the methanol concentration. In addition, methanol is lost by diffusion through the polymer electrolyte membrane (PEM) to the cathode side. These concentration changes can be significant and may cause large deviations from the ideal alcohol concentration.

Conventionally, methanol concentration changes caused by the other mechanisms are detected by intrusive sampling and measurement techniques based on various principles such as refractive index of the liquid, the speed of sound in the liquid and the liquid density. A sensor may conveniently be placed, for example, in the fuel reservoir or in the channels connecting the fuel reservoir and the fuel cell stack. The properties measured depend on the composition of the liquid. However, the properties measured are affected by the presence of $CO_2$ bubbles in the liquid and the signal is prone to inaccuracies caused by gaseous inclusions yielding unreliable measurements.

A general teaching of electrochemical impedance spectroscopy (EIS) is provided by Gamry Instruments (Warminster, Pa., USA) at gamry with the extension .com/App Notes/ EIS Primer/EIS Primer 2007.pdf of the world wide web.

EP1820040 discloses methods for detecting and indicating faulty conditions in electrochemical cells.

U.S. Pat. No. 7,201,980 discloses a fuel cell apparatus and method for feeding fuel to a fuel cell wherein information on the methanol concentration detected by a concentration sensor is sent to a controller and referred to when the fuel mixer adjusts the methanol concentration of the mixed solution. The concentration sensor provided immediately before the fuel cell is disclosed to achieve power generation while detecting the substantial methanol concentration of the mixed solution fed to the fuel cell.

U.S. Pat. No. 6,824,899 discloses apparatus and methods for regulating methanol concentration in a direct methanol fuel cell system without the need for a methanol concentration sensor. One or more operating characteristics of the fuel cell, such as the potential across the load, open circuit potential, potential at the anode proximate to the end of the fuel flow path and short circuit current of the fuel cell, are used to actively control the methanol concentration.

U.S. Pat. No. 6,794,067 discloses a direct oxidation fuel cell system in which the source fuel is diluted with a diluting fluid prior to entering the fuel cell. For a DMFC in which the methanol source fuel is diluted with water, the dielectric constant of the fuel mix comprising the source fuel and the diluting fluid is measured to determine the relative proportions of source fuel and diluting fluid within this fuel mix. This measurement is then used in a feedback loop to control the subsequent mixing of the source fuel with the diluting fluid, and in particular, to adjust the mix in the event the fuel mix is too rich or too dilute as compared to a desired mixing proportion. Additionally, a second dielectric constant measurement is used to determine the source fuel level of a fuel tank providing source fuel to the fuel cell. An optional telecommunications link is used to automatically order a source fuel refill when the source fuel runs low.

U.S. Pat. No. 6,698,278 discloses a method for indirect measurement of fuel concentration in a liquid feed fuel cell wherein fuel concentration in the fuel stream is calculated as a function of the observed current, the temperature of the fuel stream entering the fuel cell stack, and the temperature of the fuel cell stack itself, thereby eliminating the need for a separate sensor.

SUMMARY OF THE INVENTION

The present invention provides an external, nonintrusive system and method to monitor and control methanol concentrations via electrochemical impedance spectroscopy (EIS) in an operating DMFC system. The methods and systems of the present invention assess the cell operating condition, and in particular the methanol concentration, during full operation without or with minimal interruption. In the present invention, electrodes are incorporated directly in the fuel line in contact with the methanol/water circuit. These electrodes provide the data necessary for control of the methanol concentration in the fuel feed.

An aspect of the present invention relates to a method for electrically measuring a fuel cell stack during operation, said method comprising perturbing the fuel cell stack during operation by applying an alternating voltage ($V_{AC}$) overlying the output voltage of the fuel cell stack and measuring the electrical current response characteristics of the fuel cell stack. Alternating current (AC) impedance measurement can be carried out without interruption of the electrical load. The results obtained from the AC response measurements may be optionally combined or supplemented by direct voltage measurement techniques. The measurement techniques are applied in order to control and adjust the methanol concentration in the cell by either adding pure methanol or pure water to the fuel compartment.

Another aspect of the present invention relates to a system comprising a fuel cell stack, a means for measuring and recording AC impedance, a means for measuring and recording direct current (DC) and a means for adjusting the methanol or water content of the fuel cell stack based upon the AC impedance and DC measurements.

DETAILED DESCRIPTION OF THE FIGURES

The present invention relates to methods and systems for determining deviation of fuel concentrations in a DMFC by detection and quantification of a combination of electrical measurements.

A fuel cell stack is a composed of a plurality of single cells connected in series. The cell impedance of a single cell of the stack consists of an ohmic and a reactive component. The reactive component of the impedance measured depends largely on the capacitative conditions in the cell. AC impedance analysis has been used to analyze electrochemical reactions in cells.

It has now been found that AC impedance analysis can be applied for the purpose of analyzing fuel concentration during uninterrupted operation.

Figure 1:
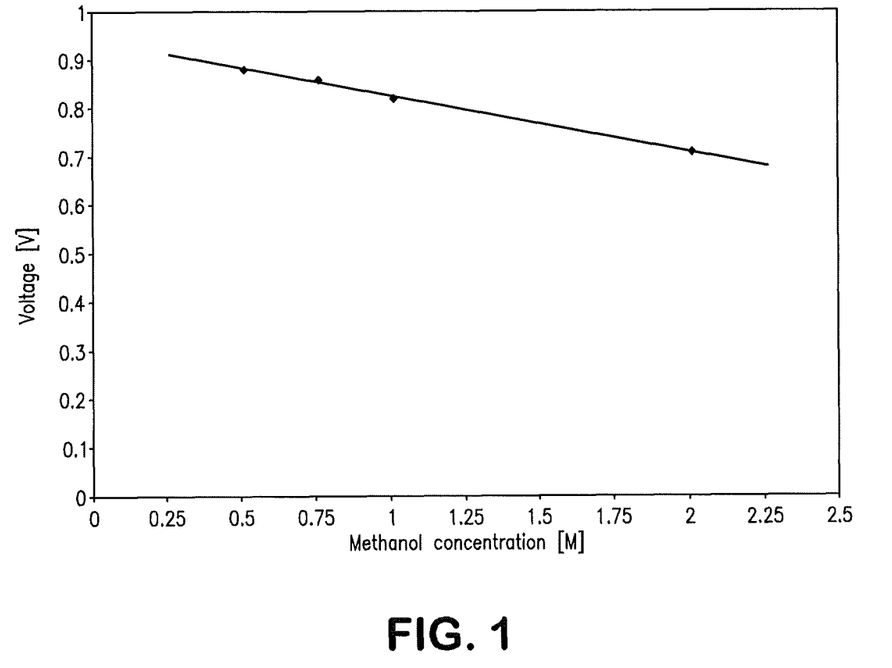
FIG. 1 is a line graph showing the open cell voltage (OCV) as function of the methanol concentration in a DMFC.

FIG. 1 shows cell voltage measured as function of the methanol concentration [MeOH]. As shown, the open cell voltage (OCV) decreases as the methanol concentration increases. Since higher energy content is associated with a higher cell voltage, a lower methanol concentration is beneficial for the energy output from the cell. However, at high loads, insufficient methanol mass transfer to the reaction sites limits power and efficiency. Power and efficiency would be expected to be enhanced at elevated methanol concentration. However, increasing methanol concentration raises the concentration gradient that drives methanol diffusion through the permeable electrolyte membrane. This leads to increased methanol diffusion and ensuing chemical short circuiting. A methanol concentration of approximately 1M has been found to be the optimum concentration.

Figure 2:
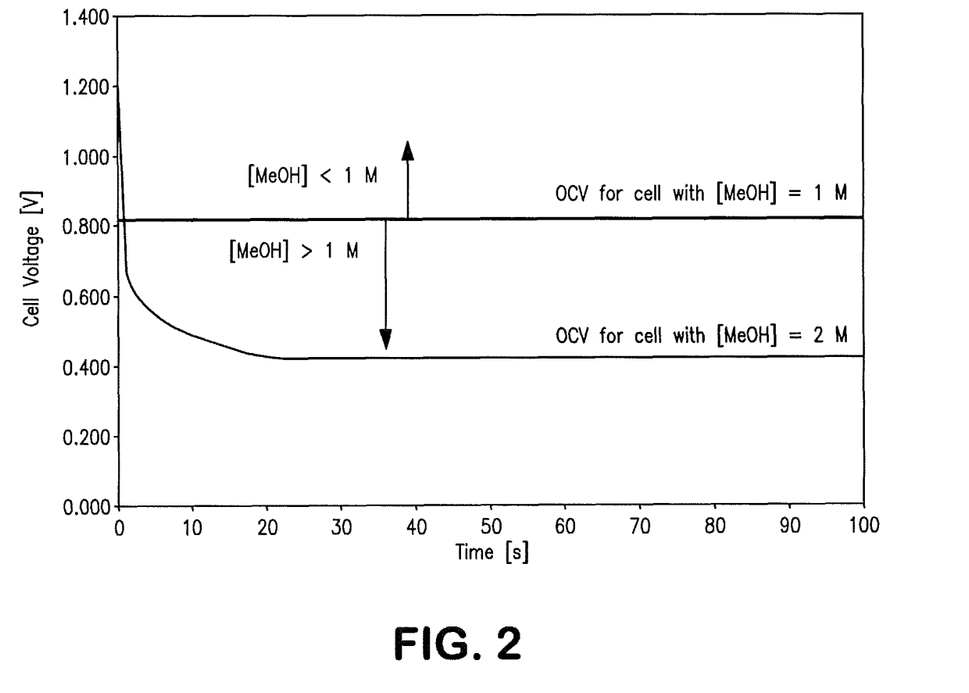
FIG. 2 is a line graph comparing the OCV as function of time for a DMFC with a 1M methanol concentration and a 2M methanol concentration.

FIG. 2 shows an example of an OCV versus time curve for an unloaded fuel cell for methanol concentrations of 1M and 2M. As shown, initially the OCV for a 2M methanol concentration is higher than the approximately 0.8 Volts obtained using a 1M concentration. Hereafter, the voltage falls to approximately 400 mV and remains a constant. The methanol concentration deviates from the nominal 1M level. Thus, the OCV will subsequently deviate from the initial OCV measurement, dependent on the current methanol concentration.

Figure 3:
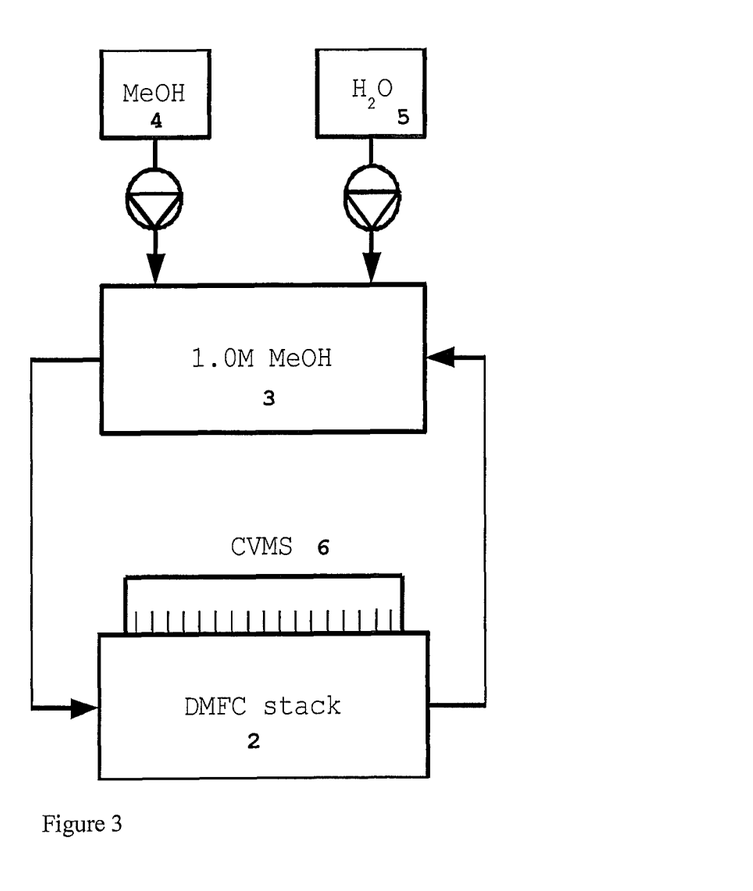
FIG. 3 is a diagram of key components in a DMFC system.

FIG. 3 shows the principal components of a conventional DMFC system. As shown therein, the system comprises a fuel cell stack 2 consisting of stacked, series connected, single cells, a methanol fuel solution reservoir 3, a reservoir for pure methanol 4, a reservoir for pure water 5, and a Cell Voltage Monitoring System (CVMS) 6 which monitors the voltages of the individual cells as well as the voltage of the entire fuel cell stack via direct connections to each separator plate.

The present invention provides methods and systems modified to determine deviation of fuel concentrations in a DMFC by detection and quantification of AC impedance.

Figure 4:
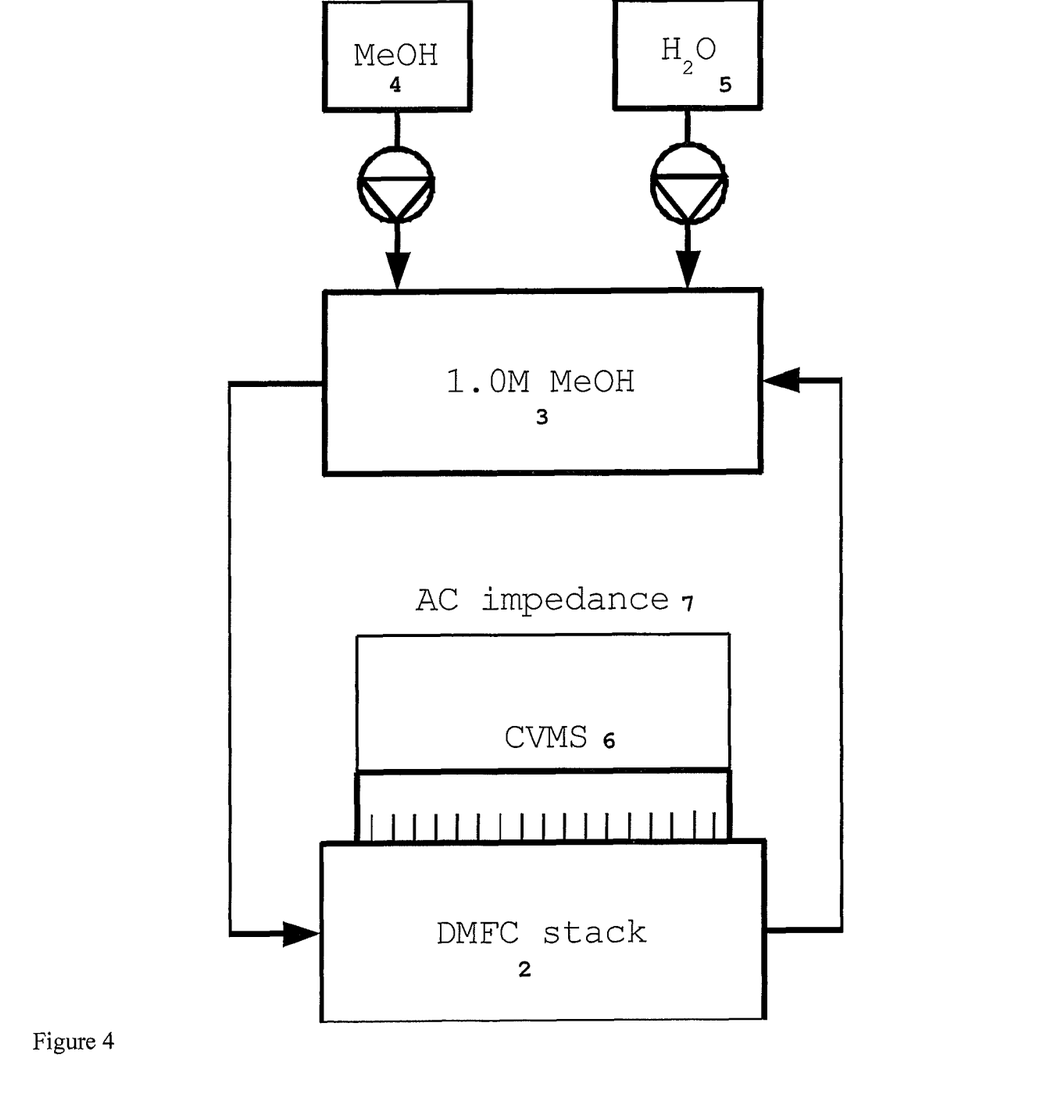
FIG. 4 is a diagram showing the key components in the DMFC system as depicted in FIG. 3 and also inclusive of an AC measuring system capable of measuring the AC impedance at a fixed frequency in accordance with the present invention.

In one embodiment, the present invention provides methods and systems, which apply AC measurement to the fuel cell. In this embodiment, as depicted in FIG. 4, each cell of the fuel cell stack is connected electrically using a cell voltage monitoring system (CVMS) 6 with a frequency response analyzer. Alternating impedance 7 is applied by connecting an overlying superimposed AC signal directly to the end terminals of the stack or to any single cell or contiguous group of cells, typically as alternating voltage with an amplitude between 5-25 mV. The AC impedance measurement equipment is connected to either the graphite plates of a single cell or the whole stack at the terminals. The impedance is measured in the frequency range of between 0.1 Hz and 10 kHz.

Exemplary equipment used to make these measurements comprises an Electrochemical Workstation Model No. IM6 supplied by ZAHNER-Elektrik Gmbh & CoKG (Thueringer Strasse 12 D-96317 Kronach. Federal Republic of Germany; see zahner with the extension .de/workstations.html of the world wide web). The work station incorporates an integrated frequency generator, a phase-sensitive detector, a lock-in amplifier, and a frequency response analyzer. Electrochemical Impedance Spectroscopy (EIS) equipment is commercially available from a wide range of suppliers including, but not limited to, Solartron Analytical (Unit B1, Armstrong Mall, Southwood Business Park, Farnborough, Hampshire, GU14 0NR, UK; see solartronanalytical with the extension .com/index.htm of the world wide web) and Princeton Applied Research EG&G (801 S. Illinois Ave., Oak Ridge, Tenn., 37830). The EIS equipment generates an AC signal that is connected via a low impedance connector to the separator plates of a single cell, a contiguous number of single cells, a sequential group of individual cells or to the whole stack. The response signal is detected via the CVMS system which has a high impedance, low voltage drop and loss, and voltage measuring capability.

The impedance measurement is used for identification and quantification of the physical phenomena which influence fuel cell performance. The alternating current signal can be modulated in a manner which facilitates the analysis of the response signal. The signal may optionally be of sinusoid form or alternatively be a steep voltage flank, such as a square wave, which enables analysis of transient electrochemical effect by means of fast Fourier Transforms and other mathematical analysis techniques.

In one embodiment, a small AC voltage signal is superimposed on a DC electromotive force supplied by the fuel cell. A response is sensed in the charge transfer rate which is a complex function of ohmic and reactive processes in the fuel cell. By variation of the superimposed AC frequency, diagnostic data is obtained from the current signal. The AC current response signal is characterized by the amplitude and phase shift and is dependent on the relaxation time of the various coupled processes taking place in the fuel cell. The AC current response signal is analyzed using established functional transforms such as Fast Fourier or other mathematical analysis techniques of sinusoidal functions. Effects of reaction kinetics, mass-transport processes and ionic conductivity care are discerned and evaluated as each characteristic electrochemical process occurs with specific time-scale characteristics. A deviation from the nominal methanol concentration is indicated as a characteristic phase shift component of the response signal. Methanol concentration is detected using an applied superimposed voltage signal in the frequency range between 0.1-10 Hz and with an amplitude of 5 mV.

An embodiment for measurement of impedance is as follows:

The AC impedance at a fixed frequency close to 1 Hz is measured at regular time intervals during operation of the fuel cell. The phase angle is obtained automatically from the EIS equipment and represents the phase angle difference between the applied voltage driver signal and the response current. The phase angle for any applied frequency is then compared to an established standard curve of phase angle as a function of methanol concentration. The comparison indicates the methanol concentration deviation from the optimal nominal value of 1M. Lower impedance is indicative of a lower methanol concentration, while a higher impedance is indicative of the methanol concentration exceeding the nominal value. The methanol concentration is then adjusted by adding either pure methanol or water depending on the impedance measurement in an effort to re-establish the optimal concentration of 1M. Such feed-back control processes are well known to those skilled in the art and are amenable to be effectuated automatically using established and conventional control techniques.

The methanol concentration can be measured periodically. While various suitable intervals can be used, it has been found that every 5 minutes is convenient and suitable. Control measurements can also be continual and corresponding automatic corrections of the methanol concentration can be made using conventional means for trend leveling and detection of spurious results.

Figure 5:
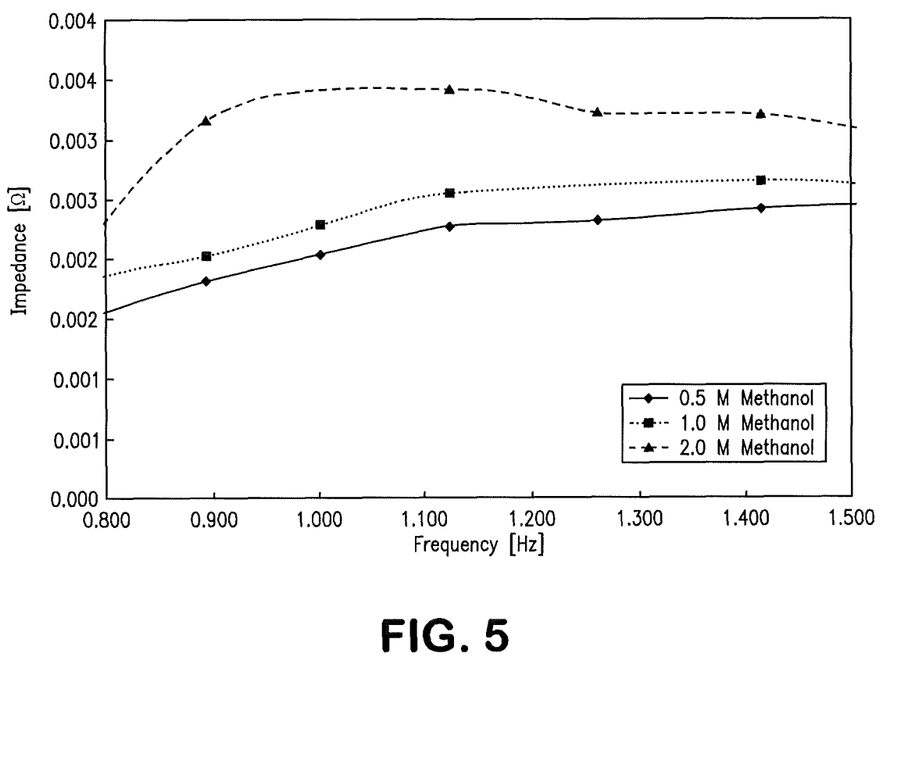
FIG. 5 is a line graph showing AC impedance as function of the frequency of the applied AC signal and various methanol concentrations. Impedance as a function of frequency at a methanol concentration of 0.5 M is depicted by closed diamonds; impedance as a function of frequency at a methanol concentration of 1M is depicted by closed squares; impedance as a function of frequency at a methanol concentration of 2.0 M is depicted by closed triangles.

The impedance measured as a function of the AC applied frequency for cells with different methanol concentrations is shown in FIG. 5.

Methanol and water are added according to the load(current), which can be calculated from the electrochemical reaction. Because of methanol and water crossover and evaporation, the amount does not always comply with 1M Methanol. This variation in concentration in the fuel tank can cause low fuel cell stack performance. If the amount of fuel in the fuel tank decreases due to methanol and water crossover or evaporation, an amount of water and methanol is added to comply with 1M Methanol.

In another embodiment, a supplementary DC technique is added and a combination of DC and AC methods are used to monitor fuel concentration. It is conventional practice to monitor the cell voltage and internal cell resistance in DMFC cells via DC measurements requiring a brief interruption of the electrical load on the fuel cell stack. Accordingly, in the present invention, DC measurements are facilitated by using equipment already conventionally fitted in an operational fuel cell system. In this embodiment of the present invention, AC impedance and supplementary DC measurements are combined to provide a diagnostic tool for single cell or stack management which measures methanol concentration in the single cell and assessment of the condition of any cell or the whole stack. Routine control is made using AC measurement. However, when greater accuracy is required and/or there arises a need for advanced diagnostics of the performance of a single cell, a region of cells, or the whole stack, DC measurements can be made to determine more precisely the condition of the cells and the corresponding methanol concentration. In this embodiment, to control the methanol concentration by the DC method, the fuel cell stack is subject to brief periodical load interruptions followed by measurements of the resulting voltage transients of the entire fuel cell stack. The period between the interruptions is typically about 5 minutes, and the interruptions typically have a duration in the range of 1-5 milliseconds. The corresponding voltage transients are measured and digitally logged and compared to the initial open cell voltage of the stack. According to the measured transient voltage, either methanol or water may be automatically added to the fuel reservoir. If the measured transient is lower than the initial open cell voltage, the methanol concentration is too low, and methanol is added to the fuel reservoir, while water is added if the opposite is the case.

What is claimed is:

1. A system for measuring and adjusting fuel concentration of a fuel cell stack comprising a fuel cell stack with a plurality of fuel cells and fuel solution reservoir, a mean for applying a direct current to one or more fuel cells of the fuel cell stack, a means for applying an alternating voltage directly to one or more fuel cells of a fuel cell stack, a means for measuring alternating current impedance of one or more fuel cells of the fuel cells stack following application of the alternating voltage, a means for measuring direct current of one or more fuel cells of the fuel cell stack following brief periodical load interruptions, and a means for adjusting methanol or water content of the fuel cell stack by adding either pure methanol or water to the fuel solution reservoir based upon the AC impedance and DC measurements, wherein lower AC impedance as compared to AC impedance at an optimal concentration of 1M methanol is indicative of a lower methanol concentration in the fuel cell stack and a need for addition of methanol to the fuel solution reservoir, while a higher AC impedance as compared to AC impedance at optimal concentration of 1M methanol is indicative of the methanol concentration in the fuel cell stack exceeding an optimal concentration of 1M and a need for water to be added to the fuel solution reservoir, and wherein lower voltage transient as measured by DC as compared to an initial open cell voltage is indicative of lower methanol concentration in the fuel cell stack and a need for methanol to be added to the fuel solution reservoir while higher voltage transient as measured by DC as compared to an initial open cell voltage is indicative of methanol concentration in the fuel cell stack exceeding the optimal concentration of 1M and a need for water to be added to the fuel solution reservoir.

\* \* \* \* \*

UNITED STATES PATENT AND TRADEMARK OFFICE
CERTIFICATE OF CORRECTION

| | |
|---|---|
| PATENT NO. | : 8,617,767 B2 |
| APPLICATION NO. | : 12/429363 |
| DATED | : December 31, 2013 |
| INVENTOR(S) | : Madeleine Odgaard |

Page 1 of 1

It is certified that error appears in the above-identified patent and that said Letters Patent is hereby corrected as shown below:

On the Title Page

Item (75) delete "Sehjerning"
Item (75) insert --Schjerning--

In the Claims

Column 6, line 60, delete "mean"
Column 6, line 60, insert --means--

Column 6, line 65, delete "fuel cells stack"
Column 6, line 65, insert --fuel cell stack--

Signed and Sealed this
Twenty-second Day of April, 2014

Michelle K. Lee
*Deputy Director of the United States Patent and Trademark Office*